United States Patent
Wood et al.

(10) Patent No.: US 10,920,088 B2
(45) Date of Patent: Feb. 16, 2021

(54) COMPOSITIONS BASED ON FLUOROPOLYMERS, FLUOROPOLYMER-MISCIBLE POLYMERS AND FREE RADICALLY-CURABLE COMPONENTS

(71) Applicant: Arkema Inc., King of Prussia, PA (US)

(72) Inventors: Kurt A. Wood, Abington, PA (US); Jeffrey Klang, West Chester, PA (US)

(73) Assignee: Arkema Inc., King of Prussia, PA (US)

( * ) Notice: Subject to any disclaimer, the term of this patent is extended or adjusted under 35 U.S.C. 154(b) by 184 days.

(21) Appl. No.: 16/098,176

(22) PCT Filed: May 12, 2017

(86) PCT No.: PCT/US2017/032331
§ 371 (c)(1),
(2) Date: Nov. 1, 2018

(87) PCT Pub. No.: WO2017/197220
PCT Pub. Date: Nov. 16, 2017

(65) Prior Publication Data
US 2019/0144683 A1     May 16, 2019

Related U.S. Application Data

(60) Provisional application No. 62/335,813, filed on May 13, 2016.

(51) Int. Cl.
| | | |
|---|---|---|
| C09D 4/06 | (2006.01) | |
| C09D 127/16 | (2006.01) | |
| C08F 259/08 | (2006.01) | |
| C09D 7/20 | (2018.01) | |
| C09D 127/20 | (2006.01) | |
| C09D 175/04 | (2006.01) | |
| C08F 222/10 | (2006.01) | |

(52) U.S. Cl.
CPC .............. *C09D 4/06* (2013.01); *C08F 259/08* (2013.01); *C09D 7/20* (2018.01); *C09D 127/16* (2013.01); *C09D 127/20* (2013.01); *C09D 175/04* (2013.01); *C08F 222/104* (2020.02)

(58) Field of Classification Search
CPC ...................... C08F 259/08; C08F 265/04–06; C08L 27/16; C09D 4/06
See application file for complete search history.

(56) References Cited

U.S. PATENT DOCUMENTS

| | | | |
|---|---|---|---|
| 3,178,399 A | 4/1965 | Lo | |
| 5,298,300 A * | 3/1994 | Hosoi | B29C 61/0616 428/34.9 |
| 5,349,003 A | 9/1994 | Kato et al. | |
| 5,646,201 A | 7/1997 | Araki et al. | |
| 2011/0118403 A1 | 5/2011 | Wood et al. | |

FOREIGN PATENT DOCUMENTS

| | | |
|---|---|---|
| GB | 827308 | 2/1960 |
| JP | 63-22872 | 1/1988 |

OTHER PUBLICATIONS

N. Tsuda, "Fluoropolymer Emulsion for High Performance Coatings", May 31, 2001, PC Magazine, pp. 1-7.

* cited by examiner

*Primary Examiner* — Ramsey Zacharia
(74) *Attorney, Agent, or Firm* — Joanne Rossi

(57) ABSTRACT

Compositions useful for forming high gloss, transparent, hard, flexible, weather- and dirt-resistant coatings on substrate surfaces are prepared using a) fluoropolymer, such as KYNAR® resins and KYNAR Aquatec® resins from Arkema Inc, b) fluoropolymer-miscible polymer and c) one or more ethylenically unsaturated compounds capable of being cured by free radical means, such as urethane acrylate oligomers and monomer reactive diluents from Sartomer USA, LLC. The compositions are capable of being cured by free radical polymerization induced by, for example, irradiation or heating.

19 Claims, No Drawings

COMPOSITIONS BASED ON FLUOROPOLYMERS, FLUOROPOLYMER-MISCIBLE POLYMERS AND FREE RADICALLY-CURABLE COMPONENTS

CROSS-REFERENCE TO RELATED APPLICATIONS

This application is a national stage application under 35 U.S.C. § 371 of PCT/US2017/032331, filed May 12, 2017 which claims priority based on US patent application U.S. 62/335,813, filed May 13, 2016, the contents of each are incorporated herein by reference in their entireties.

FIELD OF THE INVENTION

The invention pertains to compositions capable of being cured by free radical means to provide durable coatings and the like, wherein the compositions contain fluoropolymer, fluoropolymer-miscible polymer (e.g., acrylic polymer) and free radically-curable constituents such as (meth)acrylates.

DESCRIPTION OF THE RELATED ART

Fluoropolymers such as polyvinylidene fluoride (PVDF) are recognized as thermoplastics which have good weatherability and flexibility, among other desirable attributes. However, in certain end use applications such as coatings it would be advantageous to develop ways in which the hardness and dirt resistance of films prepared from such fluoropolymers could be improved. Such films should also desirably exhibit high gloss and transparency. Achieving all of these characteristics simultaneously has proven to be quite challenging, since measures taken to improve one property frequently lead to a degradation of one or more other properties.

SUMMARY OF THE INVENTION

Various exemplary, non-limiting, aspects of the present invention may be summarized as follows:

Aspect 1: A composition comprised of, consisting essentially of or consisting of:
a) at least one fluoropolymer;
b) at least one fluoropolymer-miscible polymer which has at least partial thermodynamic miscibility with the at least one fluoropolymer and which is a polymer or copolymer comprised of, consisting essentially of or consisting of at least one monomer selected from the group consisting of (meth)acrylic monomers, vinyl esters, (meth)acrylonitrile and (meth)acrylamide; and
c) a free radically-curable component comprised of, consisting essentially of or consisting of at least one compound containing at least one free radically-curable ethylenically unsaturated functional group per molecule.

Aspect 2: The composition of Aspect 1, wherein a) is present in the composition in an amount of from about 40 to about 80 weight % based on the total weight of a)+b)+c), b) is present in the composition in an amount of from about 10 to about 40 weight % based on the total weight of a)+b)+c), and c) is present in the composition in an amount of from about 5 to about 50 weight % based on the total weight of a)+b)+c).

Aspect 3: The composition of Aspect 1, wherein a) is present in the composition in an amount of from about 50 to about 70 weight % based on the total weight of a)+b)+c), b) is present in the composition in an amount of from about 15 to about 25 weight % based on the total weight of a)+b)+c), and c) is present in the composition in an amount of from about 15 to about 25 weight % based on the total weight of a)+b)+c).

Aspect 4: The composition of any one of Aspects 1 to 3, wherein the free radically-curable component is comprised of, consists essentially of or consists of at least one (meth)acrylate containing at least one (meth)acrylate functional group per molecule.

Aspect 5: The composition of any one of Aspects 1 to 4, wherein the free radically-curable component is comprised of, consists essentially of or consists of at least one compound containing at least two free radically-curable functional groups per molecule.

Aspect 6: The composition of any one of Aspects 1 to 5, wherein a) comprises, consists essentially of or consists of at least one fluoropolymer which is a homopolymer of vinylidene fluoride or a copolymer comprising, consisting essentially of or consisting of at least about 70 weight percent of vinylidene fluoride monomer units and up to about 30 weight percent of at least one type of co-monomer units.

Aspect 7: The composition of any one of Aspects 1 to 6, wherein a) comprises, consists essentially of or consists of at least one copolymer of vinylidene fluoride and at least one co-monomer selected from the group consisting of hexafluoropropene, tetrafluoroethylene and chlorotrifluoroethylene.

Aspect 8: The composition of any one of Aspects 1 to 8, wherein b) comprises, consists essentially of or consists of at least one acrylic polymer.

Aspect 9: The composition of any one of Aspects 1 to 8, wherein b) comprises, consists essentially of or consists of at least one acrylic polymer which comprises, consists essentially of or consists of from 50 to 100 weight percent of methyl methacrylate monomer units and from 0 to 50 weight percent of at least one type of (meth)acrylate co-monomer units other than methyl methacrylate monomer units.

Aspect 10: The composition of any one of Aspects 1 to 9, wherein b) is a copolymer of methyl methacrylate and at least one monomer selected from the group consisting of ethyl acrylate, methyl acrylate and ethyl methacrylate.

Aspect 11: The composition of any one of Aspects 1 to 9, wherein c) is comprised of, consists essentially of or consists of at least one (meth)acrylate containing three or more (meth)acrylate functional groups per molecule.

Aspect 12: The composition of any one of Aspects 1 to 11, wherein c) comprises, consists essentially of or consists of at least one acrylate selected from the group consisting of acrylated polyols, acrylated alkoxylated polyols and combinations thereof.

Aspect 13: The composition of any one of Aspects 1 to 12, wherein c) comprises, consists essentially of or consists of at least one acrylate selected from the group consisting of ethoxylated pentaerythritol tetraacrylate, ethoxylated trimethylolpropane triacrylate, trimethylolpropane triacrylate, propoxylated glyceryl triacrylate, propoxylated 2-neopentyl glycol diacrylate, and combinations thereof.

Aspect 14: The composition of any one of Aspects 1 to 13, wherein the composition is additionally comprised of at least one free radical initiator (e.g., a photoinitiator and/or a thermal initiator, such as a peroxide or azo compound).

Aspect 15: The composition of any one of claims 1-14, wherein the composition is additionally comprised of at least one solvent or dispersant for a), b) and c).

Aspect 16: The composition of claim 15, wherein the at least one solvent or carrier does not include any solvent which is classified as a volatile organic compound (VOC).

Aspect 17: The composition of any of claims 15 and 16, comprising water as a carrier for a) and b), and wherein a) and b) exist as an aqueous dispersion.

Aspect 18: The composition of claim 17, wherein water is the carrier for a), b) and c), and wherein a), b) and c) exist as an aqueous dispersion.

Aspect 19: The composition of claim 18, wherein said free-radically curable component c) comprises a UV curable polyurethane dispersion.

Aspect 20: The composition of any one of Aspects 1 to 19, wherein the composition is additionally comprised of at least one additive selected from the group consisting of pigments, plasticizers, stabilizers, silicones, and combinations thereof.

Aspect 21: A coated substrate comprised of, consisting essentially of or consisting of a substrate having a surface and a layer of a composition in accordance with any of Aspects 1 to 20 coated on at least a portion of the surface.

Aspect 22: The coated substrate of Aspect 21, wherein the layer of the composition has been cured.

Aspect 23: The coated substrate of either Aspect 21 or Aspect 22, wherein the substrate comprises, consists essentially of or consists of a fabric.

Aspect 24: The coated substrate of any of Aspects 21 to 23, wherein the substrate is comprised of, consists essentially of or consists of at least one of plastic or metal.

Aspect 25: The coated substrate of any of Aspects 21 to 24, wherein the surface of the substrate is comprised of, consists essentially of or consists of polyvinyl chloride, fluoropolymer or aluminum.

Aspect 26: The coated substrate of any of Aspects 21 to 25, wherein the coated substrate is an architectural fabric, a roofing membrane, a window profile, a wind turbine blade, a fencing component, or a siding component.

Aspect 27: A method of coating a substrate, comprising, consisting essentially of or consisting of the steps of applying a layer of a composition in accordance with any of Aspects 1 to 20 on a surface of the substrate and curing the layer of the composition.

Aspect 28: The method of Aspect 27, wherein curing comprises, consists essentially of or consists of exposing the layer of the composition to ultraviolet radiation, electron beam radiation or heat.

Aspect 29: A method of making a composition in accordance with any of Aspects 1 to 20, comprising, consisting essentially of or consisting of blending a mixture comprised of, consisting essentially of or consisting of a), b) and c) until homogeneous.

Aspect 30: The method of Aspect 29, wherein the mixture additionally is comprised of at least one solvent for a), b) and c).

DETAILED DESCRIPTION OF CERTAIN EMBODIMENTS OF THE INVENTION

Fluoropolymer

The fluoropolymers useful in the invention include homopolymers and copolymers having greater than 50 weight percent of fluoromonomer units by weight, preferably more than 65 weight percent, more preferably greater than 75 weight percent and most preferably greater than 90 weight percent of one or more fluoromonomers. Especially useful fluoromonomers for forming the fluoropolymer include but are not limited to: vinylidene fluoride (VDF or VF2), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, fluorinated vinyl ethers including perfluoromethyl ether (PMVE), perfluoroethylvinyl ether (PEVE), perfluoropropylvinyl ether (PPVE), perfluorobutyl vinyl ether (PBVE), longer chain perfluorinated vinyl ethers, fluorinated dioxoles, partially- or per-fluorinated alpha olefins of C4 and higher, partially- or per-fluorinated cyclic alkenes of C3 and higher, and combinations thereof. The fluoropolymers useful in the composition of the invention are advantageously thermoplastics.

Preferred fluoropolymers include homopolymers of vinylidene fluoride (VDF), tetrafluoroethylene (TFE), and/or chlorotrifluoroethylene (CTFE) as well as copolymers of one or more of these monomers with one or more co-reactive monomers (fluorinated or non-fluorinated) such as hexafluoropropylene, perfluorovinyl ether, propane, vinyl acetate, and the like.

Especially preferred fluoropolymers are polyvinylidene fluoride (PVDF) homopolymers and copolymers. Vinylidene fluoride polymers will be used to illustrate the invention, and are the preferred type of fluoropolymer.

The term "vinylidene fluoride polymer" (PVDF) used herein includes homopolymers, copolymers, and terpolymers containing polymerized units of vinylidene fluoride within its meaning. Such copolymers include those containing at least 50 mole percent, preferably at least 75 mole %, more preferably at least 80 mole %, and even more preferably at least 85 mole % of vinylidene fluoride copolymerized with at least one comonomer selected from the group of fluoromonomers listed above. Particularly preferred are copolymers comprised of from at least about 70 and up to 99 mole percent vinylidene fluoride, and correspondingly from 1 to 30 percent tetrafluoroethylene, such as the copolymer composition disclosed in British Patent No. 827,308; and copolymers comprised of about 70 to 99 percent vinylidene fluoride and 1 to 30 percent hexafluoropropene (see for example U.S. Pat. No. 3,178,399); and copolymers comprised of about 70 to 99 mole percent vinylidene fluoride and 1 to 30 mole percent trifluoroethylene.

The PVDF used in the invention may be generally prepared by any polymerizing means known in the art, such as aqueous free-radical emulsion polymerization, although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 110° C. Once the desired amount of polymer has been reached in the reactor, the monomer feed will be stopped, but initiator feed is optionally continued to consume residual monomer. Residual gases (containing unreacted monomers) are vented and the latex recovered from the reactor. The surfactant used in the polymerization can be any surfactant known in the art to be useful in PVDF emulsion polymerization, including perfluorinated, partially fluorinated, and non-fluorinated surfactants. Preferably, for regulatory reasons, the PVDF emulsion is made without fluorinated surfactants. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

In various embodiments of the invention, the fluoropolymer may have a weight average molecular weight of from 15,000 to 4,000,000 g/mol, preferably, 25,000 to 300,000 g/mol, and more preferably from 50,000-150,000 g/mol.

Fluoropolymer-Miscible Polymer

The compositions of the present invention comprise (in addition to fluoropolymer) at least one fluoropolymer-miscible polymer which has at least partial thermodynamic miscibility with the at least one fluoropolymer and which is a homopolymer or copolymer comprised of at least one monomer selected from the group consisting of (meth) acrylic monomers, vinyl esters, (meth)acrylonitrile and (meth)acrylamide. In certain embodiments, the fluoropolymer-miscible polymer is fully thermodynamically miscible with the at least one fluoropolymer. Suitable (meth)acrylic monomers include any of the alkyl methacrylate and/or alkyl acrylate monomers discussed below in connection with the embodiment where the fluoropolymer-miscible polymer is an acrylic polymer. Suitable vinyl esters include, for example, vinyl acetate. (Meth)acrylonitrile monomers include methacrylonitrile and acrylonitrile; (meth)acrylamide monomers include methacrylamide and acrylamide.

A thermodynamically miscible polymer composition will exhibit a single glass transition temperature value which typically lies intermediate between the glass transition temperatures of the individual polymeric components. Correspondingly, a partially miscible or immiscible composition will exhibit two or more glass transition temperature values. Accordingly, two or more polymers are said to be thermodynamically miscible when the free energy of mixing is negative. Additionally, thermodynamic miscibility is said to exist when a mixture of two or more polymers results in a material exhibiting a single, well defined glass transition temperature.

In certain advantageous embodiments of the invention, the fluoropolymer-miscible polymer is an acrylic polymer. "Acrylic polymer", as used herein, includes polymers and copolymers formed from alkyl methacrylate and/or alkyl acrylate monomers, and mixtures thereof. In one embodiment, the alkyl methacrylate monomer is methyl methacrylate, which may make up from 50 to 100 percent of the monomer mixture. The balance (0 to 50 percent) of the monomer mixture may be one or more other acrylate and methacrylate monomers or other ethylenically unsaturated monomers, including but not limited to, vinyl aromatic monomers such as styrene and alpha methyl styrene, acrylonitrile, and crosslinkers may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy ethyl methacrylate, 2-ethoxy ethyl acrylate and 2-ethoxy ethyl methacrylate, hydroxymethyl acrylate and hydroxymethyl methacrylate, hydroxyethyl acrylate and hydroxyethyl methacrylate, dimethylamino ethyl acrylate and dimethylamino methacrylate monomers. (Meth)acrylic acids such as methacrylic acid and acrylic acid, (meth) acrylonitrile and (meth)acrylamide may also be used as comonomers. Where the acrylic polymer is a copolymer, the copolymer may in various embodiments of the invention be a random copolymer.

In one embodiment, the acrylic polymer is formed from 65-97 weight percent of methyl methacrylate monomer units, and 3 to 35 weight percent of one or more C1-6 alkyl acrylate monomer units.

The acrylic polymer employed in the present invention may be a copolymer of two, three or more different acrylate monomers, such as a mixture of butyl acrylate, ethyl acrylate, and methyl methacrylate. Combinations or mixtures of different acrylic resins may be used.

The acrylic polymer is preferably a thermoplastic, though it can be a thermoset polymer or a mixture of the two types of polymer.

In various embodiment, the acrylic polymer is partially or fully thermodynamically miscible with the fluoropolymer.

Acrylic polymers suitable for use in the present invention can be manufactured by any means known in the art, including emulsion polymerization, solution polymerization, and suspension polymerization.

In certain embodiments, the fluoropolymer-miscible polymer (e.g., acrylic polymer) has a weight average molecular weight of from about 50,000 and 500,000 g/mol or from about 75,000 to about 200,000 g/mol, as measured by gel permeation chromatography (GPC). The molecular weight distribution of the fluoropolymer-miscible polymer may be monomodal or multimodal; the polydispersity may be low (e.g., 1 to 1.5) or relatively high (e.g., greater than 1.5).

Free Radically-Curable Ethylenically Unsaturated Compounds

Ethylenically unsaturated compounds suitable for use in the free radically-curable component of the compositions of the present invention include compounds containing at least one carbon-carbon double bond, in particular a carbon-carbon double bond capable of participating in a free radical reaction wherein at least one carbon of the carbon-carbon double bond becomes covalently bonded to an atom, in particular a carbon atom, in a second molecule. Such reactions may result in a polymerization or curing whereby the ethylenically unsaturated compound becomes part of a polymerized matrix or polymeric chain. In various embodiments of the invention, the ethylenically unsaturated compound may contain one, two, three, four, five or more carbon-carbon double bonds per molecule. In certain embodiments, the free radical curable component of the inventive composition comprises, consists essentially of or consists of at least one ethylenically unsaturated compound containing at least two carbon-carbon double bonds per molecule. In other embodiments, the free radical curable component of the inventive composition comprises, consists essentially of or consists of at least one ethylenically unsaturated compound containing at least three carbon-carbon double bonds per molecule.

Combinations of multiple ethylenically unsaturated compounds containing different numbers of carbon-carbon double bonds may be utilized in the compositions of the present invention. The carbon-carbon double bond may be present as part of an α,β-unsaturated carbonyl moiety, e.g., an α,β-unsaturated ester moiety such as an acrylate functional group or a methacrylate functional group. A carbon-carbon double bond may also be present in the ethylenically unsaturated compound in the form of a vinyl group —CH═CH$_2$ (such as an allyl group, —CH$_2$—CH═CH$_2$). Two or more different types of functional groups containing carbon-carbon double bonds may be present in the ethylenically unsaturated compound. For example, the ethylenically unsaturated compound may contain two or more functional groups selected from the group consisting of vinyl groups (including allyl groups), acrylate groups, methacrylate groups and combinations thereof.

The compositions of the present invention may, in various embodiments, contain one or more (meth)acrylate functional compounds capable of undergoing free radical polymerization (curing). As used herein, the term "(meth)acrylate" refers to methacrylate (—O—C(═O)—C(CH$_3$)═CH$_2$) as well as acrylate (—O—C(═O)—CH═CH$_2$) functional groups. Suitable free radical-curable (meth)acrylates include compounds containing one, two, three, four or more (meth) acrylate functional groups per molecule; the free radical-curable (meth)acrylates may be oligomers or monomers.

The total amount of free radical-curable ethylenically unsaturated compound (component (c)) in the composition relative to the total amount of fluoropolymer (component (a)) and polymer (component (b)) which is present is not believed to be particularly critical, but generally is selected to be an amount effective to improve at least one characteristic of the composition as compared to a composition containing the same components (a) and (b) but not any free radical-curable ethylenically unsaturated compound. The improved characteristic(s) may include any one or more of the following:

a) Improved (higher) film hardness;
b) Improved (higher) dirt resistance; and
c) Improved (higher) gloss.

A wide variety of different types of free radical-curable ethylenically unsaturated compounds may be used in the compositions of the present invention, including for example (meth)acrylated polyols and (meth)acrylated alkoxylated polyols as well as other types of (meth)acrylate oligomers and (meth)acrylate monomers.

Free Radical-Curable (Meth)Acrylated Polyols and (Meth) Acrylated Alkoxylated Polyols In certain embodiments of the invention, the free radically-curable component of the composition comprises, consists essentially of or consists of one or more (meth)acrylated polyols and/or (meth)acrylated alkoxylated polyols (in particular, one or more acrylated ethoxylated and/or propoxylated polyols). The polyol moiety present in such compounds may be based on any organic compound containing two or more hydroxyl groups per molecule, including for example diols (e.g., glycols such as 2-neopentyl glycol), triols (e.g., glycerin, trimethylolpropane), tetrols (e.g., pentaerythritol). One or more of the hydroxyl groups of the polyol may be substituted with a (meth)acrylate functional group, in particular an acrylate functional group (—OC(═O)CH═CH$_2$). All of the polyol hydroxyl groups may be (meth)acrylated, in certain embodiments of the invention. In other embodiments, the hydroxyl groups of the polyol are alkoxylated by reaction with an alkylene oxide such as ethylene oxide, propylene oxide or a combination thereof. One or more (in one embodiment, all) of the hydroxyl groups resulting from alkoxylation of the polyol are substituted with a (meth)acrylate functional group, in particular an acrylate functional group. The degree of alkoxylation may be varied as may be desired; for example, the (meth)acrylated alkoxylated polyol may contain 1 to 20 oxyalkylene units (e.g., —CH$_2$CH$_2$O—, —CH$_2$CH(CH$_3$) O—) per polyol moiety.

Illustrative examples of suitable acrylated polyols and acrylated alkoxylated polyols include, but are not limited to, ethoxylated pentaerythritol tetraacrylates, ethoxylated trimethylolpropane triacrylates, trimethylolpropane triacrylates, propoxylated glyceryl triacrylates, propoxylated 2-neopentyl glycol diacrylates, and combinations thereof.

Free Radical-Curable (Meth)Acrylate Oligomers

Suitable free radical-curable (meth)acrylate oligomers include, for example, polyester (meth)acrylates, epoxy (meth)acrylates, polyether (meth)acrylates, polyurethane (meth)acrylates and combinations thereof.

Exemplary polyester (meth)acrylates include the reaction products of acrylic or methacrylic acid or mixtures thereof with hydroxyl group-terminated polyester polyols. The reaction process may be conducted such that a significant concentration of residual hydroxyl groups remain in the polyester (meth)acrylate or may be conducted such that all or essentially all of the hydroxyl groups of the polyester polyol have been (meth)acrylated. The polyester polyols can be made by polycondensation reactions of polyhydroxyl functional components (in particular, diols) and polycarboxylic acid functional compounds (in particular, dicarboxylic acids and anhydrides). The polyhydroxyl functional and polycarboxylic acid functional components can each have linear, branched, cycloaliphatic or aromatic structures and can be used individually or as mixtures.

Examples of suitable epoxy (meth)acrylates include the reaction products of acrylic or methacrylic acid or mixtures thereof with glycidyl ethers or esters.

Suitable polyether (meth)acrylates include, but are not limited to, the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of cyclic ethers such as tetrahydrofuran or alkylene oxides with a starter molecule. Suitable starter molecules include water, hydroxyl functional materials, polyester polyols and amines.

Polyurethane (meth)acrylates (sometimes also referred to as "urethane (meth)acrylates") capable of being used in the compositions of the present invention include urethanes based on aliphatic and/or aromatic polyester polyols and polyether polyols and aliphatic and/or aromatic polyester diisocyanates and polyether diisocyanates capped with (meth)acrylate end-groups.

In various embodiments, the polyurethane (meth)acrylates may be prepared by reacting aliphatic and/or aromatic diisocyanates with OH group terminated polyester polyols (including aromatic, aliphatic and mixed aliphatic/aromatic polyester polyols), polyether polyols, polycarbonate polyols, polycaprolactone polyols, polydimethysiloxane polyols, or polybutadiene polyols, or combinations thereof to form isocyanate-functionalized oligomers which are then reacted with hydroxyl-functionalized (meth)acrylates such as hydroxyethyl acrylate or hydroxyethyl methacrylate to provide terminal (meth)acrylate groups. For example, the polyurethane (meth)acrylates may contain two, three, four or more (meth)acrylate functional groups per molecule.

One or more urethane diacrylates are employed in certain embodiments of the invention. For example, the composition may comprise at least one urethane diacrylate comprising a difunctional aromatic urethane acrylate oligomer, a difunctional aliphatic urethane acrylate oligomer and combinations thereof. In certain embodiments, a difunctional aromatic urethane acrylate oligomer, such as that available from Sartomer USA, LLC (Exton, Pa.) under the trade name CN9782, may be used as the at least one urethane diacrylate. In other embodiments, a difunctional aliphatic urethane acrylate oligomer, such as that available from Sartomer USA, LLC under the trade name CN9023, may be used as the at least one urethane diacrylate. CN9782, CN9023, CN978, CN965, CN9031, CN8881, and CN8886, all available from Sartomer USA, LLC, may all be advantageously employed as urethane diacrylates in the compositions of the present invention.

Free Radical-Curable (Meth)Acrylate Monomers

Illustrative examples of suitable free radical-curable ethylenically unsaturated monomers include 1,3-butylene glycol di(meth)acrylate, butanediol di(meth)acrylate, 1,6-hexanediol di(meth)acrylate, alkoxylated hexanediol di(meth)acrylate, alkoxylated aliphatic di(meth)acrylate, alkoxylated neopentyl glycol di(meth)acrylate, dodecyl di(meth) acrylate cyclohexane dimethanol di(meth)acrylate, diethylene glycol di(meth)acrylate, dipropylene glycol di(meth)acrylate, n-alkane di(meth) acrylate, polyether di(meth) acrylates, ethoxylated bisphenol A di(meth)acrylate, ethylene glycol di(meth)acrylate, neopentyl glycol di(meth)acrylate, polyester di(meth)acrylate, polyethylene glycol di(meth)acrylate, polypropylene glycol di(meth)acrylate, propoxylated neopentyl glycol diacrylate, tricyclodecane dimethanol diacrylate, triethylene glycol di(meth)acrylate, tetraethylene glycol di(meth)acrylate tripropylene glycol di(meth)acrylate, ditrimethylolpropane tetra(meth)acrylate, dipentaerythritol penta(meth)acrylate, ethoxylated pentaerythritol tetra(meth)acrylate, dipentaerythritol penta(meth)acrylate, dipentaerythritol penta(meth)acrylate, penta(meth)acrylate ester, pentaerythritol tetra(meth)acrylate, ethoxylated trimethylolpropane tri(meth)acrylate, alkoxylated trimethylolpropane tri(meth)acrylate, highly propoxylated glyceryl tri(meth)acrylate, trimethylolpropane tri(meth)acrylate, trimethylolpropane tri(meth)acrylate, pentaerythritol tri(meth)acrylate, propoxylated glyceryl tri(meth)acrylate, propoxylated trimethylolpropane tri(meth)acrylate, trimethylolpropane trimethacrylate, tris (2-hydroxy ethyl) isocyanurate tri(meth)acrylate, 2(2-ethoxyethoxy)ethyl (meth)acrylate, 2-phenoxyethyl (meth)acrylate, 3,3,5-trimethylcyclohexyl (meth)acrylate, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formal (meth)acrylate, cycloaliphatic acrylate monomer, dicyclopentadienyl (meth)acrylate, diethylene glycol methyl ether (meth)acrylate, ethoxylated (4) nonyl phenol (meth)acrylate, ethoxylated nonyl phenol (meth)acrylate, isobornyl (meth)acrylate, isodecyl (meth)acrylate, isooctyl (meth)acrylate, lauryl (meth)acrylate, methoxy polyethylene glycol (meth)acrylate, octyldecyl (meth)acrylate, stearyl (meth)acrylate, tetrahydrofurfuryl (meth) acrylate, tridecyl (meth)acrylate, and/or triethylene glycol ethyl ether (meth)acrylate, t-butyl cyclohexyl (meth)acrylate, alkyl (meth)acrylate, dicyclopentadiene di(meth)acrylate, alkoxylated nonylphenol (meth)acrylate, phenoxyethanol (meth)acrylate, octyl (meth)acrylate, decyl (meth)acrylate, dodecyl (meth)acrylate, tetradecyl (meth)acrylate, tridecyl (meth)acrylate, cetyl (meth)acrylate, hexadecyl (meth)acrylate, behenyl (meth)acrylate, diethylene glycol ethyl ether (meth)acrylate, diethylene glycol butyl ether (meth)acrylate, triethylene glycol methyl ether (meth)acrylate, dodecanediol di (meth)acrylate, dodecane di (meth)acrylate, dipentaerythritol penta/hexa(meth)acrylate, pentaerythritol tetra(meth)acrylate, ethoxylated pentaerythritol tetra(meth)acrylate, ethoxylated trimethylolpropane tri(meth)acrylate, trimethylolpropane tri(meth)acrylate, di-trimethylolpropane tetra(meth)acrylate, propoxylated glyceryl tri(meth)acrylate, pentaerythritol tri(meth)acrylate, propoxylated glyceryl tri(meth)acrylate, propoxylated trimethylolpropane tri(meth)acrylate, trimethylolpropane tri(meth)acrylate, and tris (2-hydroxy ethyl) isocyanurate tri(meth)acrylate, and combinations thereof.

Solvent

In certain embodiments, the compositions of the present invention comprise one or more solvents. Such solvents may be advantageously selected so as to be capable of solubilizing one or more of the other components of the composition (e.g., the fluoropolymer, fluoropolymer-miscible polymer and/or free radically curable component) and/or providing a composition that is homogeneous. Where the composition is intended to be used as a coating, the solvent may assist in lowering the viscosity of the composition or otherwise modifying the composition's rheological properties, making it easier to apply the composition as a thin film to a surface of a substrate. The solvent may be a latent solvent, i.e., a compound that solubilizes one or more components of the composition (in particular, the fluoropolymer component) only when heated to a temperature above 25° C.

The composition may contain in particular one or more organic solvents, which may be non-reactive organic solvents.

Suitable solvents may include, for example, organic solvents such as: ketones (both acyclic ketones and cyclic ketones) such as acetone, methyl ethyl ketone, iso-butyl ethyl ketone and cyclopentanone; esters such as ethyl acetate, butyl acetate, ethylene glycol methyl ether acetate, ethylene glycol monoethyl ether acetate, ethylene glycol monobutyl ether acetate, and propylene glycol methyl ether acetate; carbonates such as dimethyl carbonate, propylene glycol carbonate, and ethylene glycol carbonate; alcohols such as ethoxyethanol, methoxyethanol, 1-methoxy-2-propanol, methyl alcohol, ethyl alcohol, n-propyl alcohol, butyl alcohol, isopropyl alcohol, and diacetone alcohol; aromatic solvents such as xylene, benzene, toluene, and ethylbenzene; alkanes such as hexanes and heptane; glycol ethers such as ethylene glycol monobutyl ether (butyl cellosolve), ethylene glycol monomethyl ether (2-methoxyethanol), ethylene glycol monoethyl ether (2-ethoxyethanol), ethylene glycol monopropyl ether (2-propoxyethanol), ethylene glycol monoisopropyl ether (2-isopropoxyethanol), ethylene glycol monophenyl ether (2-phenoxyethanol), ethylene glycol monobenzyl ether (2-benzyloxyethanol), diethylene glycol monomethyl ether (methyl carbitol), diethylene glycol monoethyl ether (carbitol cellosolve), diethylene glycol mono-n-butyl ether (2-(2-butoxyethoxy)ethanol), ethylene glycol dimethyl ether, ethylene glycol diethyl ether, and ethylene glycol dibutyl ether; ethers such as tetrahydrofuran, dimethyl ether, diethyl ether; as well as amides such as N-methyl pyrrolidone and dimethylformamide; as well as combinations thereof.

In advantageous embodiments of the invention, no solvent is present in the composition which is classified as a volatile organic compound (VOC). As used herein, "volatile organic compound" or "VOC" means a compound that is classified as a volatile organic compound under 40 C.F.R. § 51.100(s). In other embodiments, a solvent or combination of solvents is present in the composition, but each such solvent is a non-VOC solvent.

In various embodiments, the composition is comprised of at least one solvent selected from the group consisting of ketones, esters, carbonates, alcohols, alkanes, aromatics, ethers, amides and glycol ethers and combinations thereof. According to certain aspects of the invention, the at least one solvent is included in an amount sufficient to render the compositions described herein sufficiently flowable for application to a substrate. For example, in various embodiments of the invention, the compositions described herein have a viscosity of less than 4000 cPs, or less than 3500 cPs, or less than 3000 cPs or less than 2500 cPs, as measured at 25° C. using a Brookfield viscometer, model DV-II, using a 27 spindle (with the spindle speed varying typically between 50 and 200 rpm, depending on viscosity).

In particular embodiments, the at least one solvent is removed from the compositions described herein before curing by exposure to an energy source (radiation, heating) is initiated.

For example, solvent may be removed by evaporation prior to energy-induced curing. If so desired, a substrate having one or more layers of the composition applied to a surface thereof may be heated and/or subjected to a flow of gas and/or placed under vacuum so as to facilitate solvent evaporation.

In certain embodiments of the invention, the composition is comprised of at least 5%, at least 10%, at least 15%, at least 20%, at least 25%, at least 30%, at least 35%, at least 40%, at least 45% or at least 50% by weight solvent (either a single solvent or a combination of solvents). In other embodiments, the composition is comprised of not more than 95%, not more than 90%, not more than 85%, not more than 80% or not more than 75% by weight solvent. For example, the composition may comprise 50 to 75% by weight solvent (i.e., 25 to 50 weight % solids).

The compositions of the present invention may be formulated so as to contain little or no non-reactive solvent, e.g., less than 10% or less than 5% or even 0% non-reactive solvent, based on the total weight of the composition. Such solvent-less or low-solvent compositions may be formulated using various components, including for example low viscosity reactive diluents, which are selected so as to render the composition sufficiently low in viscosity, even without non-reactive solvent being present, that the composition can be easily applied at a suitable application temperature to a substrate surface so as to form a relatively thin, uniform coating layer. One or more of the free radically curable ethylenically unsaturated compounds present in the composition may, for example, function as reactive diluents.

Water-Borne Systems

In certain embodiments of the invention, the composition is formulated to contain water, rather than non-reactive solvent. Such compositions may be referred to as waterborne systems, wherein one or more or all of the components of the composition are present as dispersions in water. Emulsifiers and/or dispersing agents may be employed to create and maintain stable aqueous dispersions of the fluoropolymer, fluoropolymer-miscible polymer, free radical-curable ethylenically unsaturated compound(s) and/or other composition components. One or more of the composition components may, in certain embodiments, be self-dispersing.

Such a water-borne composition may be applied to the surface of a substrate, with the water serving to reduce the viscosity of the composition. The applied coating may then be treated to remove the water (by evaporation or heating/baking, for example). Curing of the free radical-polymerizable component of the composition (for example, by irradiation of the coating by an appropriate energy source) may be conducted after evaporation of the water.

In certain waterborne embodiments, the fluoropolymer and fluoropolymer-miscible polymer of the invention may be supplied as an aqueous dispersion containing both components, for instance hybrid dispersions combining both the fluoropolymer and fluoropolymer-miscible polymer in a single dispersion particle. The fluoropolymer can be used as a seed polymer, to which one or more monomers are added and polymerized. Several monomers maybe added in one or more sequential steps, to form a hybrid particle with two or more individual phases. Such particles are described by US20110118403 A1, U.S. Pat. Nos. 5,349,003, 5,646,201, and by N. Tsuda, "Fluoropolymer Emulsion for High Performance Coatings", (http://www.pcimag.com/articles/85878-fluoropolymer-emulsion-for-high-performance-coatings). Particular advantageous embodiments are hybrid particle aqueous dispersions where the fluoropolymer is a vinylidene fluoride homopolymer or a copolymer of vinylidene fluoride with one or more of the comonomers hexafluoropropylene, chlorotrifluoroethylene, or tetrafluoroethylene, and the fluoropolymer-miscible polymer is an acrylic copolymer, with the weight ratio of fluoropolymer to acrylic between about 50:50 and 80:20, more preferably between about 60:40 and 75:25 fluoropolymer:acrylic. For these advantageous waterborne embodiments, it is particularly useful when the glass transition temperatures of the components are selected such that the aqueous dispersion has a minimum film formation temperature of less than about 50° C. In such cases, after addition of the free radical-curable ethylenically unsaturated compound(s), it may be possible to have formulations which do not contain added organic solvents of any kind, with water as the only solvent. These compositions are particularly advantageous in terms of having very low levels of volatile organic compounds.

In certain of these waterborne embodiments, the free radical-curable ethylenically unsaturated compound(s) may be comprised of one or more (meth)acrylate monomers or oligomers. These may be added directly to the aqueous dispersion containing the fluoropolymer and fluoropolymer-miscible polymer, or they may be pre-emulsified using a surfactant or other emulsifying agent, as is well known in the art. Alternatively, the free radical-curable ethylenically unsaturated compound(s) may be comprised of a UV curable polyurethane dispersion (UV-PUD). UV-PUDs comprise a self-dispersing (meth)acrylated polyurethane oligomer dispersed into water, and may additionally contain one or more other (meth)acrylate monomers or oligomers. UV—PUDs are known in the art and are widely used commercially in UV-curable wood coatings and other applications such as plastic, metal or paper coatings, inks and adhesives. Examples of UV-PUDs include CN9500 and CN9501 available from Sartomer Americas, a business unit of Arkema, Inc.

Other Ingredients

The compositions of the present invention may contain, in addition to fluoropolymer, fluoropolymer-miscible polymer, free radically curable component and, optionally, solvent and/or water, one or more additional ingredients or additives, if so desired. Suitable exemplary additives include free radical initiators (including photoinitiators and free radical initiators other than photoinitiators such as thermal initiators, e.g., peroxides and azo compounds), pigments, plasticizers, stabilizers, silicones, flame retardants, fillers, impact modifiers, antioxidants, antistatic agents, surfactants, and combinations thereof.

In certain embodiments of the invention, the compositions described herein include at least one photoinitiator and are curable with radiant energy. For example, the photoinitiator(s) may be selected from the group consisting of α-hydroxyketals, phenylglyoxylates, benzyldimethylketals, α-aminoketones, mono-acyl phosphines, bis-acyl phosphines, phosphine oxides, metallocenes and combinations thereof. In particular embodiments, the at least one photoinitiator may be 1-hydroxy-cyclohexyl-phenyl-ketone and/or 2-hydroxy-2-methyl-1-phenyl-1-prop anone.

Suitable photoinitiators include, but are not limited to, 2-methylanthraquinone, 2-ethylanthraquinone, 2-chloroanthraquinone, 2 benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-phenylbenzoin, Michler's ketone, benzophenone, 4,4'-bis-(diethylamino) benzophenone, acetophenone, 2,2 diethyloxyacetophenone, diethyloxyacetophenone, 2-isopropylthioxanthone, thioxanthone, diethyl thioxanthone, 1,5-acetonaphtlene, ethyl-p-dimethylaminobenzoate, benzil ketone, α-hydroxy keto, 2,4,6-trimethylbenzoyldiphenyl phosphinoxide, benzyl dimethyl ketal, benzil ketal (2,2-dimethoxy-1,2-diphenylethanone), 1-hydroxycylclohexyl phenyl ketone, 2-methyl-1-[4-(methylthio) phenyl]-2-morpholinopropanone-1,2-hydroxy-2-methyl-1-phenyl-propanone, oligomeric α-hydroxy ketone, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone, 50/50 blend, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphophine oxide, phenyl bis(2,4,6-trimethyl benzoyl) phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, (cumene) cyclopentadienyl iron(ii) hexafluorophosphate, 9,10-diethoxy and 9,10-dibutoxyanthracene, 2-ethyl-9,10-dimethoxyanthracene, thioxanthen-9-one and combinations thereof.

The amount of photoinitiator is not considered to be critical, but may be varied as may be appropriate depending upon the photoinitiator(s) selected, the amount of free radical-curable ethylenically unsaturated compound present in the composition, the radiation source and the radiation conditions used, among other factors. Typically, however, the amount of photoinitiator may be from 0.05% to 5% by weight, based on the total weight of the composition (not including any non-reactive solvent that may be present).

In certain embodiments of the invention, the compositions described herein do not include any initiator and are curable with electron beam energy. In other embodiments, the compositions described herein include at least one free radical initiator that decomposes when heated or in the presence of an accelerator and are curable chemically (i.e., without having to expose the composition to radiation). The at least one free radical initiator that decomposes when heated or in the presence of an accelerator may, for example, comprise a peroxide or azo compound. Suitable peroxides for this purpose may include any compound, in particular any organic compound, that contains at least one peroxy (—O—O—) moiety, such as, for example, dialkyl, diaryl and aryl/alkyl peroxides, hydroperoxides, percarbonates, peresters, peracids, acyl peroxides and the like. The at least one accelerator may comprise, for example, at least one tertiary amine and/or one or more other reducing agents based on metal salts (such as, for example, carboxylate salts of transition metals such as iron, cobalt, manganese, vanadium and the like and combinations thereof). The accelerator(s) may be selected so as to promote the decomposition of the free radical initiator at room or ambient temperature to generate active free radical species, such that curing of the composition is achieved without having to heat or bake the composition. In other embodiments, no accelerator is present and the composition is heated to a temperature effective to cause decomposition of the free radical initiator and to generate free radical species which initiate curing of the free radical-curable ethylenically unsaturated compound(s) present in the composition.

Thus, in various embodiments of the present invention, the compositions described herein are curable by techniques selected from the group consisting of radiation curing (UV radiation or electron beam curing), electron beam curing, chemical curing (using a free radical initiator that decomposes when heated or in the presence of an accelerator, e.g., peroxide curing), heat curing or combinations thereof.

The flexibility of a coating or film obtained using the compositions of the present invention may be improved by the inclusion of one or more plasticizers. Suitable plasticizers include, but are not limited to, dibenzoate plasticizers and phthalate plasticizers. The composition may comprise, for example, at least 0.1 weight % and not more than 10 weight % plasticizer, based on the total weight of the composition.

Surface-specific properties of coatings or films obtained using the compositions of the present invention may be improved by the inclusion of one or more low-surface-energy additives which are capable of concentrating at the surface after the application of the formulation to its substrate, but prior to curing. Suitable low surface energy additives of this type include, but are not limited to, perfluorinated oligomers, fluorosurfactants, fluorosilicones, organosilanes, low molecular weight polysiloxanes, and methyl and ethyl silicate. Especially suitable additives of this type are those which can be anchored at the surface through crosslinking, either through a free radical curing mechanism, or by some other chemistry such as the condensation of silanol groups. The composition may comprise, for example, at least 0.01 weight % and not more than 5 weight % of such low-surface-energy additives, based on the total weight of the composition.

Proportions of Fluoropolymer, Fluoropolymer-Miscible Polymer and Free Radically-Curable Component The relative proportions of fluoropolymer, fluoropolymer-miscible polymer and free radically-curable component may be varied and selected as may be desired to achieve certain properties in the resulting composition, particularly after curing of the composition to form a film or coating. The particular types of components used in the composition will also affect the characteristics of the cured composition.

For example, fluoropolymer ("a)") may be present in the composition in an amount of from about 1 to about 98 weight %, fluoropolymer-miscible polymer ("b)") may be present in the composition in an amount of from about 1 to about 98 weight %, and free radically-curable component ("c)") may be present in the composition in an amount of from about 1 to about 98 weight %, wherein the total of a)+b)+c)=100% and the stated weight percentages of a), b) and c) are based on the total weight of a)+b)+c). Typically, however, the amount of c) will be less than the total amount of a)+b). In certain embodiments, the weight amount of fluoropolymer a) is at least as much as the weight amount of fluoropolymer-miscible polymer.

In other particularly desirable embodiments of the invention, the relative proportions of a), b) and c) may be as follows:

I. a) is present in the composition in an amount of from about 40 to about 80 weight % based on the total weight of a)+b)+c), b) is present in the composition in an amount of from about 10 to about 40 weight % based on the total weight of a)+b)+c), and c) is present in the composition in an amount of from about 5 to about 50 weight % based on the total weight of a)+b)+c);

II. a) is present in the composition in an amount of from about 50 to about 70 weight % based on the total weight of a)+b)+c), b) is present in the composition in an amount of from about 15 to about 25 weight % based on the total weight of a)+b)+c), and c) is present in the composition in an amount of from about 15 to about 25 weight % based on the total weight of a)+b)+c).

Methods of Making

The compositions of the present invention may be prepared by any suitable method, including blending or mixing of the various components. The order in which the components are combined is not believed to be particularly critical. In embodiments where a solvent is used, the solvent or combination of solvents may be first combined with the fluoropolymer to form a solution, before being mixed with the other components. The free radically-curable component may be utilized as a solvent or in combination with a non-reactive solvent to first solubilize the fluoropolymer.

Applications and Methods of Using

The compositions of the invention are particularly suitable for forming coatings (films) on a wide variety of substrates, including for example metal substrates, thermoplastic substrates, thermoset substrates, composite substrates, ceramic substrates, glass substrates and the like. The surface of the substrate to be coated with the composition may be comprised of a plurality of different materials. Any of the conventional coating techniques may be utilized, such as casting, extrusion, and other methods known in the art.

The composition of the invention is capable of providing a crack-resistant, flexible, highly weatherable, chemical resistant, and/or dirt-shedding protective coating to many types of articles, including but not limited to pipe, architectural structures, fabric/textiles (including architectural fabric), window frames, siding, fencing, In various embodiments, the composition of the invention may be applied as a topcoat over a substrate layer comprised of fluoropolymer. The topcoat may be clear or pigmented.

A coating of the composition may be applied to a surface of a substrate at ambient temperature or near ambient temperature, such as in the range of 10–35° C. Once applied, the composition may be cured, using free radical curing (wherein the free radically curable ethylenically unsaturated compound(s) present in the composition react in a polymerization reaction). Free radical curing techniques are not particularly limited and may include techniques that expose the composition to polymerization accelerants. Such techniques may include exposure to radiant energy such as visible radiation and UV energy (from sources such as medium pressure Hg lamps or LEDs) or exposure to electron-beam radiation, or exposure to chemicals (e.g., free radical initiators that decompose when heated or in the presence of accelerator).

The free radical polymerization can occur by exposure to radiant energy (e.g., UV light, visible light and/or LED light) or to electron beam energy or to chemicals (e.g., free radical initiators that decompose and initiate free radical reactions when heated or in the presence of an accelerator, such as peroxides) for a time effective to cause cross-linking/polymerization of the free radical-curable ethylenically unsaturated compound(s). The intensity and/or wavelength of the radiant energy may be adjusted as desired to achieve the desired extent of curing. The time period of exposure is not particularly limited, so long as the time period is effective to cure the composition into a viable article (e.g., a solid film). Time frames for exposure to energy to cause sufficient cross-linking are not particularly limited and may be from several seconds to several minutes.

The compositions of the present invention may be applied to a substrate surface in any known conventional manner, for example, by spraying, knife coating, roller coating, casting, drum coating, dipping, and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise metal, paper, cardboard, glass, thermoplastics such as polyolefins, polycarbonate, acrylonitrile butadiene styrene (ABS), and blends thereof, composites, wood, leather and combinations thereof.

The incorporation of free radical-curable ethylenically unsaturated compound(s) into a fluoropolymer+fluoropolymer-miscible polymer system can lead to coatings with an outstanding combination of properties not achievable in the absence of the free radical-curable ethylenically unsaturated compounds, such as good weatherability, good flexibility, high gloss, high film hardness, transparency and dirt resistance.

Within this specification embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

In this example, as shown in Table 1, 21 clear coats were formulated with different amounts of Kynar® ADS-2, a copolymer of vinylidene fluoride and hexafluoropropylene (available from Arkema), Paraloid® B-44 methyl methacrylate/ethyl acrylate copolymer (available from Dow Chemical) and SR 494 ethoxylated 4 pentaerythritol tetraacrylate (available from Sartomer USA LLC, Exton, Pa.). Irgacure® 1173 (available from BASF) was used as the photoinitiator at a level of 2% by weight on non-volatiles. Methyl ethyl ketone and N-methyl pyrrolidone were used as solvents; the final formulations had a non-volatile (solids) content of 20-25%. Glass beads were added to the formulation and the mixtures were rolled to obtain a homogeneous coating composition. Then, these formulations were cast on chromated aluminum Q-panels AL-412 and on green architectural fabric primed with "Platamid 1176" (available from Arkema, Inc.) with a 5 mil gap square tool, air dried and baked for 30 minutes at 50° C. After the bake, the samples were UV cured using a UVEXS Conveyor Fusion Curing Unit model 15645-6 "A" with an H bulb, using 4 passes at a speed of 50 ft/min and a lamp power of 330 W/in.

The samples testing consisted of gloss and Koenig hardness measurements on the coated aluminum and a flexibility test on the coated architectural fabric (mandrel test and by bending the substrate by hand). The Koenig hardness is an average of 3 measurements and the gloss 60 is an average of eight measurements (Table 1). Higher gloss and clarity of the coating indicate a good mixing of the three components.

TABLE 1

Koenig hardness, gloss 60 and flexibility of different Kynar® ADS-2, Paraloid® B-44 and Sartomer® SR494 ethoxylated 4 pentaerythritol tetraacrylate mixtures.

| Kynar® ADS-2 | Paraloid® B-44 | Sartomer® SR494 | Koenig hardness (sec) | Gloss 60 | Flexibility |
|---|---|---|---|---|---|
| 100% | 0% | 0% | 54.7 | 65.5 | Pass |
| 90% | 10% | 0% | 73.3 | 137.6 | Pass |
| 90% | 0% | 10% | 65.7 | 107.0 | Pass |
| 80% | 0% | 20% | 79.0 | 134.5 | Pass |
| 80% | 10% | 10% | 85.7 | 101.6 | Pass |
| 80% | 20% | 0% | 63.0 | 21.5 | Pass |
| 70% | 0% | 30% | 81.3 | 8.3 | Fail |
| 70% | 10% | 20% | 76.7 | 137.0 | Pass |
| 70% | 20% | 10% | 72.0 | 134.5 | Pass |
| 70% | 30% | 0% | 68.0 | 83.9 | Pass |
| 60% | 0% | 40% | 82.3 | 10.3 | Fail |
| 60% | 10% | 30% | 99.0 | 6.5 | Fail |
| 60% | 20% | 20% | 124.0 | 120.2 | Pass |
| 60% | 30% | 10% | 56.7 | 97.1 | Pass |
| 60% | 40% | 0% | 49.0 | 35.9 | Pass |
| 50% | 0% | 50% | 103.7 | 10.8 | Fail |
| 50% | 10% | 40% | 107.3 | 81.5 | Fail |
| 50% | 20% | 30% | 93.7 | 36.7 | Fail |
| 50% | 30% | 20% | 106.7 | 18.7 | Pass |
| 50% | 40% | 10% | 70.7 | 33.7 | Fail |
| 50% | 50% | 0% | 33.3 | 78.3 | Pass |

Using these particular components, the overall best combination of properties in the cured coating was found to be achieved using about 60% by weight Kynar® ADS-2 fluoropolymer, about 20% by weight Paraloid® B-44 methyl methacrylate/ethyl acrylate, and about 20% by weight Sartomer® SR494 ethoxylated 4 pentaerythritol tetraacrylate.

Example 2

The previous study was replicated using other free radically-curable compounds ("FRCC") substituted for the Sartomer® SR494 ethoxylated 4 pentaerythritol tetraacrylate in five of the formulations, expected (based on previous testing) to have a good balance between a high gloss 60, a high Koenig hardness and a good flexibility.

The four other free radically-curable compounds (all products of Sartomer USA, LLC) were SR454 (ethoxylated 3 trimethylolpropane triacrylate), SR351 (trimethylolpropane triacrylate), SR9020 (propoxylated 3 glyceryl triacrylate) and SR 9003B (propoxylated 2 neopentyl glycol diacrylate). The same procedure was followed and the same testing was performed (Table 2).

TABLE 2

Koenig hardness, gloss 60 and flexibility of different Kynar® ADS-2, Paraloid® B-44 and Sartomer® FRCC mixtures.

| Kynar® ADS-2 | Paraloid® B-44 | FRCC | FRCC Sartomer® Product Name | Koenig hardness (sec) | Gloss 60 | Flexibility |
|---|---|---|---|---|---|---|
| 80 | 10 | 10 | SR494 | 85.7 | 101.6 | Pass |
| 70 | 20 | 10 | SR494 | 72.0 | 134.5 | Pass |
| 60 | 20 | 20 | SR494 | 124.0 | 120.2 | Pass |
| 50 | 0 | 50 | SR494 | 103.7 | 10.8 | Fail |
| 50 | 10 | 40 | SR494 | 107.3 | 81.5 | Fail |
| 80 | 10 | 10 | SR454 | 80.0 | 34.2 | Pass |
| 70 | 20 | 10 | SR454 | 109.0 | 64.5 | Pass |
| 60 | 20 | 20 | SR454 | 129.3 | 101.3 | Pass |
| 50 | 0 | 50 | SR454 | 99.3 | 14.3 | Fail |
| 50 | 10 | 40 | SR454 | 109.7 | 20.3 | Pass |
| 80 | 10 | 10 | SR351 | 92.7 | 28.2 | Pass |
| 70 | 20 | 10 | SR351 | 120.0 | 78.8 | Pass |
| 60 | 20 | 20 | SR351 | 148.0 | 92.1 | Pass |
| 50 | 0 | 50 | SR351 | 116.3 | 40.7 | Fail |
| 50 | 10 | 40 | SR351 | 144.3 | 57.5 | Fail |

TABLE 2-continued

Koenig hardness, gloss 60 and flexibility of different Kynar ® ADS-2, Paraloid ® B-44 and Sartomer ® FRCC mixtures.

| Kynar ® ADS-2 | Paraloid ® B-44 | FRCC | FRCC Sartomer ® Product Name | Koenig hardness (sec) | Gloss 60 | Flexibility |
|---|---|---|---|---|---|---|
| 80 | 10 | 10 | SR9020 | 85.0 | 69.3 | Pass |
| 70 | 20 | 10 | SR9020 | 106.7 | 81.0 | Pass |
| 60 | 20 | 20 | SR9020 | 120.7 | 36.2 | Pass |
| 50 | 0 | 50 | SR9020 | 50.3 | 5.1 | Fail |
| 50 | 10 | 40 | SR9020 | 97.3 | 7.7 | Pass |
| 80 | 10 | 10 | SR9003B | 72.7 | 23.9 | Pass |
| 70 | 20 | 10 | SR9003B | 105.7 | 35.0 | Pass |
| 60 | 20 | 20 | SR9003B | 104.7 | 13.7 | Pass |
| 50 | 0 | 50 | SR9003B | 23.3 | 4.7 | Pass |

The compositions containing Sartomer® SR351 trimethylolpropane triacrylate appeared to produce the highest Koenig hardness regardless of the particular formulation. In addition, the coatings containing the trimethylolpropane triacrylate as the free radically-curable component appeared clear. Nevertheless, their gloss 60 value is lower than obtained in compositions containing Sartomer® SR494 ethoxylated 4 pentaerythritol tetraacrylate as the free radically-curable component. This gloss diminution could be the result of a small amount of surface wrinkling from cross-linking.

Example 3

In this example, additional formulations were made in order to determine if similar results can be obtained using Kynar® SL-2 (Arkema) as the fluoropolymer component (Table 3).

The same procedure as the previous preparation and testing was executed. Promising results were obtained. The film containing Kynar® SL-2 fluoropolymer had a glossier appearance, but a lower Koenig hardness, than the films containing Kynar® ADS-2 fluoropolymer.

TABLE 3

Koenig hardness, gloss 60 and flexibility of different Kynar ® SL-2, Paraloid ® B-44 and Sartomer ® SR351 mixtures.

| Kynar ® SL-2 | Paraloid ® B-44 | Sartomer ® SR351 | Koenig hardness (sec) | Gloss 60 | Flexibility |
|---|---|---|---|---|---|
| 65 | 20 | 15 | 96.0 | 131.5 | Pass |
| 60 | 20 | 20 | 109.3 | 131.0 | Pass |
| 55 | 25 | 20 | 118.3 | 137.5 | Pass |

Example 4

The coating compositions described in the previous examples are solvent-borne paints. The formulations were made with MEK and NMP as solvents, both of which are classified as VOCs under U.S. regulations. In order to avoid the use of these solvents, trials were performed in which NMP was replaced with dimethyl carbonate (DMC) and MEK was replaced with acetone (Table 4). The gloss 60 and the Koenig hardness of the resulting coatings were not significantly affected by this substitution, but all the coatings containing DMC lost their flexibility on the architectural fabric. This loss could be due to poor adhesion, so a cross-hatch adhesion test was performed. However, all of the coatings adhered very well on the primed architectural fabric. A dibenzoate plasticizer (Kflex® 975P) was added into the formulation for the purpose of improving the flexibility; 5% of the DMC was replaced with Kflex® 975P. A significant improvement in flexibility was observed. The plasticizer lowered the Koenig hardness, but did not affect the gloss 60.

TABLE 4

Solvent substitution in the UV curable formulations.

| Kynar ® ADS-2 | Paraloid ® B-44 | Sartomer ® SR351 | Solvent | Koenig hardness (sec) | Gloss 60 | Adhesion | Flexibility |
|---|---|---|---|---|---|---|---|
| 65 | 20 | 15 | Acetone/NMP | 113.7 | 72.7 | n/a | Pass |
| 60 | 20 | 20 | Acetone/NMP | 121.0 | 82.8 | n/a | Pass |
| 55 | 25 | 20 | Acetone/NMP | 108.7 | 154.3 | n/a | Pass |
| 65 | 20 | 15 | Acetone/DMC | 111.7 | 127.2 | 100% | Fail |
| 60 | 20 | 20 | Acetone/DMC | 100.0 | 121.2 | 100% | Fail |
| 55 | 25 | 20 | Acetone/DMC | 110.3 | 134.4 | 100% | Fail |
| 65 | 20 | 15 | MEK/NMP | 80.7 | 118.0 | n/a | Pass |
| 60 | 20 | 20 | MEK/NMP | 71.3 | 134.6 | n/a | Pass |
| 55 | 25 | 20 | MEK/NMP | 70.3 | 134.8 | n/a | Pass |
| 65 | 20 | 15 | MEK/DMC | 104.7 | 129.0 | 100% | Fail |
| 60 | 20 | 20 | MEK/DMC | 117.7 | 129.7 | 100% | Fail |

TABLE 4-continued

Solvent substitution in the UV curable formulations.

| Kynar® ADS-2 | Paraloid® B-44 | Sartomer® SR351 | Solvent | Koenig hardness (sec) | Gloss 60 | Adhesion | Flexibility |
|---|---|---|---|---|---|---|---|
| 55 | 25 | 20 | MEK/DMC | 119.7 | 132.0 | 100% | Fail |
| 65 | 20 | 15 | Acetone/DMC/Kflex® 975P | 92.3 | 129.7 | n/a | Pass |

Example 5

In order to improve the dirt resistance of the coatings, Sartomer® CN4002 additive was added into the formulation (Table 5). The additive is a fluorinated acrylate oligomer which is hydrophobic. It is believed that during the curing process the additive moves onto the surface of the coatings and make the cured surface hydrophobic.

Each of these four formulations was hazy. The presence of the Sartomer® CN4002 additive did not affect the Koenig hardness or the flexibility of the coatings (Table 5). A possible increase in hydrophobicity was observed.

TABLE 5

Koenig hardness, gloss 60 and flexibility of different
Kynar® SL-2, Paraloid® B-44 and
Sartomer® SR351 mixtures containing 0.5% of Sartomer® CN4002.

| Kynar® ADS-2 | Paraloid® B-44 | Sartomer® SR351 | Koenig hardness (sec) | Gloss 60 | Flexibility |
|---|---|---|---|---|---|
| 65% | 15% | 20% | 109.3 | 23.5 | Pass |
| 60% | 20% | 20% | 114.0 | 49.2 | Pass |
| 55% | 25% | 20% | 121.7 | 128.7 | Pass |
| 50% | 30% | 20% | 121.7 | 126 | Pass |

Examples 6-8

Additional formulations were prepared to determine if similar positive results can be obtained using different fluoropolymer compositions: Zeffle® LC700 (a copolymer of vinylidene fluoride, chlorotrifluoroethylene, and tetrafluoroethylene with melting point 90 C, supplied by Daikin Industries, Ltd.), KYNAR® 9301 (a terpolymer of vinylidene fluoride, hexafluoropropylene, and tetrafluoroethylene with melting point 90 C, supplied by Elf Atochem), and Kynar® 7201 (a copolymer of vinylidene fluoride and tetrafluoroethylene with melting point 120 C, supplied by Elf Atochem). The same procedure and testing as in Example 1 was executed using a 50:50 MEK/DMC solvent package with a 60:20:20 blend of fluoropolymer, Paraloid® B-44 acrylic, and SR351 (trimethylolpropane triacrylate). As shown in Table 6, these films showed similar results for hardness, gloss and flexibility when compared to their ADS-2 and SL-2 counterparts, shown in Tables 2 and 3 respectively.

TABLE 6

Koenig hardness, gloss 60 and flexibility of formulations
with varying fluoropolymer composition.

| Example | Fluoropolymer | Koenig hardness (sec) | Gloss 60 | Flexibility |
|---|---|---|---|---|
| 6 | Zeffle® LC700 | 143 | 128 | Pass |
| 7 | Kynar® 9301 | 142 | 130 | Pass |
| 8 | Kynar® 7201 | 140 | 106 | Pass |

Examples 9-14: Pigmented and Stain Formulations

For these formulations, the following component mixtures were prepared:

Fluoropolymer solution A (20% solution of VF2/HFP copolymer):

| | |
|---|---|
| KYNAR® ADS-2 | 20 parts |
| Acetone | 40 parts |
| Dimethyl carbonate | 40 parts |

Acrylic solution B (30% solution of acrylic copolymer):

| | |
|---|---|
| Paraloid® B-44 | 30 parts |
| Methyl ethyl ketone | 35 parts |
| Methyl isobutyl ketone | 35 parts |

White pigment dispersion C (20% rutile TiO2 and 20% acrylic copolymer):

| | |
|---|---|
| Paraloid® B-44 | 20 parts |
| Methyl ethyl ketone | 60 parts |
| TiPure® TS-6200 (Chemours) | 20 parts |

Red pigment dispersion D (20% DPP Red and 20% acropolymer):

| | |
|---|---|
| Paraloid® B-44 | 20 parts |
| Methyl ethyl ketone | 60 parts |
| Irgazin® Red L 3660 HD (BASF) | 20 parts |

Then the following examples and comparative examples were prepared:

TABLE 7

|  | Example 9. White pigmented formulation | Comparative Example C-9. White pigmented formulation |
|---|---|---|
| Fluoropolymer solution A (20% solution of VF2/HFP copolymer) | 36.6 | 36.6 |
| Acrylic solution B (30% solution of acrylic) |  | 8.3 |
| Trimethylol propane triacrylate (TMPTA) | 2.5 |  |
| Irgacure ® 4265 (Photoinitiator) | 0.5 |  |
| White pigment dispersion C (20% TiO2 and 20% acrylic) | 16.0 | 16.0 |
| Total weight | 55.6 | 60.9 |
| Wt % solids, total | 30% | 27% |
| Weight fraction of fluoropolymer:acrylic:multifunctional acrylate | 56:25:19 | 56:44:0 |
| Pigment:binder, approximate, by weight | 20:80 | 20:80 |
| Konig hardness, after UV curing ("H" bulbs, 4 passes, 40 feet per minute at 320 W/in) | 108.0 | 97 |

TABLE 8

|  | Example 10. Red pigmented formulation | Example 11. Yellow pigmented formulation | Example 12. Blue pigmented formulation | Example 13. Magenta pigmented formulation | Example 14. Stain formulation |
|---|---|---|---|---|---|
| Fluoropolymer solution A (20% solution of VF2/HFP copolymer) | 36.6 | 36.6 | 36.6 | 36.6 | 36.6 |
| Acrylic solution B (30% solution of acrylic) |  |  |  |  |  |
| Trimethylol propane triacrylate (TMPTA) | 2.5 | 2.5 | 2.5 | 2.5 | 2.5 |
| Irgacure ® 4265 (Photoinitiator) | 0.5 | 0.5 | 0.5 | 0.5 | 0.5 |
| Red pigment dispersion D (20% DPP Red and 20% acrylic) | 16.0 |  |  |  |  |
| Chromachem 844-2852 Organic Yellow dispersion with acrylic |  | 11 |  |  |  |
| Chromachem 844-7262 Phthalo Blue dispersion with acrylic |  |  | 9.0 |  |  |
| Chromachem 844-0453 Magenta dispersion with acrylic |  |  |  | 11.0 |  |
| Chromachem 844-1054 Trans red iron oxide with acrylic |  |  |  |  | 6.0 |
| Chromachem 844-1852 Trans Yellow Iron oxide with acrylic |  |  |  |  | 5.0 |
| Weight fraction of fluoropolymer:acrylic:multifunctional acrylate | 56:25:19 | 59:21:20 | 57:24:19 | 58:22:20 | 55:26:19 |
| Total weight | 55.6 | 50.6 | 48.6 | 50.6 | 50.6 |

In the above examples where commercial pigment dispersions were used for the pigmentation, the thermoplastic acrylic in the composition is provided by the pigment dispersion. All formulations were drawn down at 75 microns wet film thickness, dried several minutes at ambient temperature to remove solvent, then cured using a small UV-cure unit with H bulbs, UV intensity 320 W/inch, belt speed 40 feet/minute, 4 passes.

Example 15

A waterborne UV-curable composition of the composition was prepared according to the following formula:

Pre-emulsion E of TMPTA (Sartomer 351A): The following were added sequentially under conditions of good shear, until a stable mousse was formed:

| water | 56.4 |  |
|---|---|---|
| sodium dioctyl sulfosuccinate | 3.6 | (2% on TMPTA) |
| SR351A (TMPTA) | 180 |  |

KYNAR Aquatec® ARC (on solids:

| 70% VF2/HFP copolymer + 30% MMA/BA acrylic copolymer, with a minimum film formation temperature of 27 C.) | 200 |
|---|---|
| Byk 346 wetting agent | 0.2 |
| Coapur ®XS-71 thickener | 1 |
| Preemulsion E of TMPTA | 17 |
| Darocur 1173 photoinitiator | 2 |
| Water | 14 |
| Total | 234.2 |

Formulations were drawn down at about 75 microns wet film thickness and given a 10 minute bake at 50 C to remove residual water. then they were UV cured with H bulbs, 320 W/in, 40 fpm, 4 passes to give glossy films of about 25 micron dry film thickness with the following properties:

60 degree Gloss on a black Leneta chart was 73.

Konig hardness on aluminum was 86 seconds immediately after curing; 106 seconds after three weeks.

Examples 16-20

Acrylic solution F 30% solution of Elvacite® 2042, an ethyl methacrylate polymer, in MEK

|  | grams | % "solids" |
|---|---|---|
| Elvacite ® 2042 (Lucite International) | 30 | 30.0% |
| MEK | 70 | 0.0% |
| total | 100 | 30.0% |

TABLE 9

|  | Example 16 | Example 17 | Example 18 | Example 19 | Example 20 |
| --- | --- | --- | --- | --- | --- |
| Fluoropolymer solution A (20% solution of VF2/HFP copolymer) | 75.0 | 75.0 | 75.0 | 70.0 | 70.0 |
| Sartomer SR494 (Ethoxylated pentaerithrytol tetraacrylate) | 4.5 | 4.5 | 4.5 | 4.0 | 4.0 |
| Irgacure 1173 | 1.0 | 1.0 | 1.0 | 1.0 | 1.0 |
| Acrylic solution F (poly ethyl methacrylate), 30% solids | 12 |  |  | 20.0 |  |
| Paraloid(R) AU-1033 30% solids (OH-functional acrylic polymer, Dow Chemical) |  | 12.0 |  |  |  |
| Paraloid(R) A21 LV 30% solids (methyl methacrylate polymer, Dow Chemical) |  |  | 12.0 |  | 20.0 |
| Approximate ratio fluoropolymer:Acrylic:multifunctional acrylate (MFA) | 65:16:19 | 65:16:19 | 65:16:19 | 58:25:17 | 58:25:17 |
| 60 Degree gloss on black Leneta chart | 50 | 73 | 72 | 77 | 75 |
| L* (haze) on black Leneta chart | 7.1 | 6.8 | 6.6 | 6.1 | 6.2 |
| Konig hardness on chromated aluminum, one day old | 156 | 77 | 124 | 99 | 104 |
| Flexibility, 3 mm mandrel | Pass | Pass | Pass | Pass | Pass |

All formulations were drawn down at 125 microns wet film thickness, dried several minutes at ambient temperature to remove solvent, then cured using a small UV-cure unit with H bulbs, UV intensity 320 W/inch, belt speed 40 feet/minute, 4 passes.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

What is claimed is:

1. A composition comprised of:
   a) at least one fluoropolymer which is a homopolymer of vinylidene fluoride or a copolymer comprising at least about 70 weight percent of vinylidene fluoride monomer units and up to about 30 weight percent of at least one type of co-monomer units;
   b) at least one fluoropolymer-miscible polymer which has at least partial thermodynamic miscibility with the at least one fluoropolymer and which is a polymer or copolymer comprised of at least one monomer selected from the group consisting of (meth)acrylic monomers, (meth)acrylonitrile and (meth)acrylamide; and
   c) a free radically-curable component comprised of at least one compound containing at least two free radically-curable ethylenically unsaturated functional group per molecule; and
   wherein a) is present in the composition in an amount of from about 40 to about 80 weight % based on the total weight of a)+b)+c), b) is present in the composition in an amount of from about 10 to about 40 weight % based on the total weight of a)+b)+c), and c) is present in the composition in an amount of from about 5 to about 50 weight % based on the total weight of a)+b)+c).

2. The composition of claim 1, wherein the free radically-curable component is comprised of at least one (meth)acrylate containing at least one (meth)acrylate functional group per molecule.

3. The composition of claim 1, wherein a) comprises at least one copolymer of vinylidene fluoride and at least one co-monomer selected from the group consisting of hexafluoropropene, tetrafluoroethylene and chlorotrifluoroethylene.

4. The composition of claim 1, wherein b) comprises at least one acrylic polymer which comprises from 50 to 100 weight percent of methyl methacrylate monomer units and from 0 to 50 weight percent of at least one type of (meth)acrylate co-monomer units other than methyl methacrylate monomer units.

5. The composition of claim 1, wherein b) is a copolymer of methyl methacrylate and at least one monomer selected from the group consisting of ethyl acrylate, methyl acrylate and ethyl methacrylate.

6. The composition of claim 1, wherein c) is comprised of at least one (meth)acrylate containing three or more (meth)acrylate functional groups per molecule.

7. The composition of claim 1, wherein c) comprises at least one acrylate selected from the group consisting of acrylated polyols, acrylated alkoxylated polyols and combinations thereof.

8. The composition of claim 1, wherein c) comprises at least one acrylate selected from the group consisting of ethoxylated pentaerythritol tetraacrylate, ethoxylated trimethylolpropane triacrylate, trimethylolpropane triacrylate, propoxylated glyceryl triacrylate, propoxylated 2-neopentyl glycol diacrylate, and combinations thereof.

9. The composition of claim 1, wherein the composition is additionally comprised of at least one free radical initiator.

10. The composition of claim 1, wherein the composition is additionally comprised of at least one solvent or carrier for a), b) and c).

11. The composition of claim 10, comprising water as a carrier for a) and b), and wherein a) and b) exist as an aqueous dispersion.

12. The composition of claim 11, wherein water is the carrier for a), b) and c), and wherein a), b) and c) exist as an aqueous dispersion.

13. The composition of claim 12, wherein said free-radically curable component c) comprises a UV curable polyurethane dispersion.

14. A coated substrate comprised of a substrate having a surface and a layer of a composition in accordance with claim 1 coated on at least a portion of the surface.

15. The coated substrate of claim 14, wherein the layer of the composition has been cured.

16. The coated substrate of claim 14, wherein the coated substrate is selected from the group consisting of an architectural fabric, a roofing membrane, a window profile, a wind turbine blade, a fencing component and a siding component.

17. A method of coating a substrate, comprising the steps of applying a layer of a composition in accordance with claim 1 on a surface of the substrate and curing the layer of the composition.

18. The method of claim 17, wherein curing comprises exposing the layer of the composition to ultraviolet radiation, electron beam radiation or heat.

19. A method of making a composition in accordance with claim 1, comprising blending a mixture comprised of a), b) and c) until homogeneous.

\* \* \* \* \*